United States Patent
Cheng et al.

(10) Patent No.: US 11,848,809 B1
(45) Date of Patent: Dec. 19, 2023

(54) SYSTEMS AND METHODS FOR OFDM PROFILE MANAGEMENT

(71) Applicant: CABLE TELEVISION LABORATORIES, INC., Louisville, CO (US)

(72) Inventors: Lin Cheng, Superior, CO (US); Jingjie Zhu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 245 days.

(21) Appl. No.: 17/495,623

(22) Filed: Oct. 6, 2021

Related U.S. Application Data (60) Provisional application No. 63/088,203, filed on Oct. 6, 2020.

(51) Int. Cl.
| | |
|---|---|
| *H04L 12/64* | (2006.01) |
| *H04L 27/26* | (2006.01) |
| *H04L 67/306* | (2022.01) |
| *H04W 74/00* | (2009.01) |
| *H04L 12/28* | (2006.01) |

(52) U.S. Cl.
CPC .... *H04L 27/26412* (2021.01); *H04L 12/2898* (2013.01); *H04L 12/6418* (2013.01); *H04L 27/2672* (2013.01); *H04L 67/306* (2013.01); *H04W 74/004* (2013.01); *H04L 2012/6478* (2013.01)

(58) Field of Classification Search
CPC .......... H04L 27/26412; H04L 12/2898; H04L 12/6418; H04L 27/2672; H04L 67/306; H04L 2012/6478; H04W 74/004
See application file for complete search history.

(56) References Cited

U.S. PATENT DOCUMENTS

| | | | | |
|---|---|---|---|---|
| 2002/0154620 | A1* | 10/2002 | Azenkot | H04L 27/0008 370/347 |
| 2004/0017830 | A1* | 1/2004 | Dale | H04W 28/18 370/465 |
| 2008/0019397 | A1* | 1/2008 | Hou | H04L 12/2861 370/498 |
| 2015/0293677 | A1* | 10/2015 | Fong | G06F 3/04842 715/717 |
| 2016/0233980 | A1* | 8/2016 | Pantelias | H04L 1/0041 |
| 2020/0053018 | A1* | 2/2020 | White | H04L 47/11 |

* cited by examiner

*Primary Examiner* — Kenneth T Lam
(74) *Attorney, Agent, or Firm* — Josh C. Snider (57) ABSTRACT

A profile optimizing method is provided for a transmission of active subcarriers over a channel to user devices. The method includes steps of (i) obtaining a symbol mapping architecture for the set of profiles, (ii) calculating, from the symbol mapping architecture, a plurality of mapping orders for the set of profiles different from the logical order, (iii) determining, from the calculated plurality of mapping orders, a particular mapping order having a higher spectral efficiency than the logical order, (iv) reordering the respective codewords of the set of profiles to correspond to the particular mapping order, (v) re-mapping the symbol mapping architecture to a number of symbols corresponding to the reordered codewords, and (vi) transmitting the symbols to the population of user devices. The symbol mapping architecture includes a codeword for each profile of the set of profiles, and maps the codewords to a different number by logical order.

20 Claims, 4 Drawing Sheets

SYSTEMS AND METHODS FOR OFDM PROFILE MANAGEMENT

CROSS REFERENCE TO RELATED APPLICATIONS

This application claims the benefit of and priority to U.S. Provisional Patent Application Ser. No. 63/088,203, filed Oct. 6, 2020, the disclosure of which is herein incorporated by reference in its entirety.

BACKGROUND

The field of the disclosure relates generally to digital transmission systems, and more particularly, to multi-carrier wired, wireless, and optical digital transmission systems.

The Data Over Cable Service Interface Specification (DOCSIS) has become the common communication standard for digital information delivery across a number of communication media, including cable plants, fiber optic transmission, and hybrid fiber coaxial (HFC) networks. At present, version 3.1 of DOCSIS (DOCSIS 3.1, or D3.1) is in widespread use, and version 4.0 (DOCSIS 4.0 or D4.0) is being deployed. The four generations of DOCSIS have established technical milestones in the industry.

In particular, the widespread standardization of DOCSIS has changed the nature of information delivery in fundamental ways. One such fundamental change has been the increased capability in the downstream transmission that utilizes orthogonal frequency-division multiplexing (OFDM) profiles (referred to herein as "user profiles") for individual respective downstream user receiving devices to optimize network performance. The concept and implementation of the user profile in DOCSIS has provided an effective tool for mitigating the frequency-variant problem arising from the various channels of different respective users.

Exemplary systems and methods for DOCSIS profile management are described in greater detail in U.S. Pat. No. 10,944,500, as well as co-pending U.S. patent application Ser. No. 16/377,030, filed Apr. 5, 2019, the disclosures of all of which are incorporated by reference herein. These prior profile management systems and methods techniques for providing well-designed and optimized sets of modulation profiles improved information delivery according to the actual conditions of a given network. Nevertheless, the increasing downstream capability provided with each new DOCSIS generation offers additional opportunity to further improve downstream spectral efficiency and total capacity.

Accordingly, there is a desire in the industry to further improve spectral efficiency in the downstream transmission delivery using existing hardware and structural architectures, and without significant increase to the processing resources of a given communication network.

BRIEF SUMMARY

In an embodiment, a method is provided for optimizing a set of profiles profiles in a transmission to a population of user devices over a channel. The transmission includes a plurality of active subcarriers. The method includes a step of obtaining a symbol mapping architecture for the set of profiles. The symbol mapping architecture (i) includes a respective codeword for each profile of the set of profiles, and (ii) maps the respective codewords to a first number of symbols according to a logical order of each profile in the set of profiles. The method further includes steps of (a) calculating, from the symbol mapping architecture, a plurality of mapping orders for the set of profiles different from the logical order, (b) determining, from the calculated plurality of mapping orders, a particular mapping order having a higher spectral efficiency than the logical order, (c) reordering the respective codewords of the set of profiles to correspond to the particular mapping order, (d) re-mapping the symbol mapping architecture to a second number of symbols corresponding to the reordered codewords, and (e) transmitting the second number of symbols to the population of user devices.

In an embodiment, a transmitter for a communication network includes a modem termination system (MTS) and a codeword reordering unit (CRU). The MTS is in operable communication with a communication medium. The MTS is configured to (i) obtain a plurality of downstream profiles for a respective plurality of downstream user devices connected to the communication medium, (ii) map codewords respectively associated with the plurality of downstream profiles to subcarriers within a first number of symbols according to a logical order of the downstream profiles, and (iii) transmit a second number of symbols to the plurality of downstream user devices in a downstream transmission. The CRU is configured to (i) calculate a plurality of mapping orders for the plurality of downstream profiles different from the logical order, (ii) determine, from the calculated plurality of mapping orders, a particular mapping order having a higher spectral efficiency than the logical order, (iii) reorder the codewords to correspond to the particular mapping order, and (iv) re-map the first number of symbols to the second number of symbols corresponding to the reordered codewords.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, unless specified to the contrary, "modem termination system," or "MTS'" may refer to one or more of a CMTS, an optical network terminal (ONT), an optical line terminal (OLT), a network termination unit, a satellite termination unit, and/or other termination devices and systems. Similarly, "modem" may refer to one or more of a CM, an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

According to the embodiments described herein, systems and methods are provided that further improve the spectral efficiency, and thus the total transmission capacity, of the downstream transmission, using innovative supplemental processes for re-coding and/or re-mapping DOCSIS profiles generated and/or optimized according to known techniques (e.g., as disclosed in U.S. Pat. No. 10,944,500). In an exemplary embodiment, after establishment and mapping of initial DOCSIS user profiles for individual end user devices (e.g., modems, cable modems (CMs), or sets of modems/CMs), the present systems and methods utilize substantially existing DOCSIS communication network hardware to further improve the downstream spectral efficiency, and without substantial modifications to the DOCSIS network to implement the additional re-coding/re-mapping processes.

In some embodiments, the present systems and methods realize significant spectral efficiency improvements with relatively straightforward additional processing modifications to the known DOCSIS subcarrier mapping procedure. In other embodiments, the present techniques analyze the generated DOCSIS user profiles and re-order the codewords and/or modulations of the respective profiles to maximize the spectral efficiency of the mapped user profiles.

As described in U.S. Pat. No. 10,944,500, DOCSIS 3.1 OFDM profiles include a wide range of modulation choices that may be implemented to fine-tune a CM's transmission to achieve the best possible performance over given network conditions. This previous patent provided techniques for well-designed and optimized sets of modulation profiles that enable a downstream channel to operate with a lower SNR margin and a higher throughput. These prior optimized profiles were obtained using such techniques including, without limitation, a K-means coalescation algorithm (KCA), a profile management application (PMA), proactive network maintenance (PNM) measurements, a brute force approach, a profile coalescation algorithm (PCA), and a clustering and K-means algorithm (KMA).

DOCSIS Downstream OFDM Channels

A DOCSIS-configured modem typically supports two or more independently configurable OFDM channels, with each channel typically occupying a downstream spectrum of up to 192 MHz. At maximum channel bandwidth, 192 MHz corresponds to 3841 subcarriers in 4K mode, and 7681 subcarriers in 8K mode. A downstream OFDM signal typically includes data subcarriers, scattered pilots, continuous pilots, and PHY link channel PLC subcarriers. Two such downstream channel types are summarized in Table 1, below.

TABLE 1

Downstream Channel Options

| Subcarrier Spacing | 25 kHz | 50 KHz |
|---|---|---|
| Symbol Period | 40 µs | 20 µs |
| FFT Size | 8192 | 4096 |
| Maximum Number of subcarriers | 7600 | 3800 |

In operation of this example, the downstream OFDM channel bandwidth may vary from 24 MHz to 192 MHz. Bandwidths smaller than 192 MHz are achieved by zero-valuing the subcarriers prior to performing an inverse discrete Fourier transform (IDFT), that is, by adjusting the equivalent number of active subcarriers while maintaining the same subcarrier spacing of 25 kHz or 50 kHz, as described in the DOCSIS 3.1 PHY Specification.

Downstream Modulation Profiles

Each of the subcarriers in the downstream OFDM channel may be configured to use a different modulation order, thereby allowing the MTS to optimize the downstream transmissions across the frequency band (e.g., 192 MHz) of the channel. The specific choice of modulation order, selected for each subcarrier, is communicated to the modems in the form of a modulation profile, which thus allows the modems to interpret and demodulate the signal.

A typical DOCSIS modulation profile includes a vector of bit-loading values, that is, an integer value for each active subcarrier in the downstream channel. For modulation orders ranging from 16-QAM to 16384-QAM, the bit-loading values of the vector may then range from 4 to 14 (skipping 5). In practice though, it is expected that low bit-loading values (e.g., 7 or less) will be used infrequently since most plants support at least 256 QAM.

In an exemplary embodiment, the MTS generates a "Profile A" for the modems in a particular Service Group. Profile A then functions as the lowest common denominator profile, and may be successfully received by all modems in the Service Group. The MTS may then generate up to 15 additional modulation profiles, which may also be communicated to the Service Group. Each modem may then be assigned up to four modulation profiles, including Profile A (used for broadcast frames), one optimized profile for the modem's unicast traffic, and possibly two additional profiles that may be used for multicast traffic. In practice, since the number of modems in a Service Group is expected to be greater than 15 (in most cases), it is expected that each profile will be used by a group of modems that have similar channel characteristics.

Before the advent of DOCSIS 3.1, all traffic had been transmitted by (i) using the lowest common denominator modulation (e.g., 64-QAM or 256-QAM), (ii) setting the downstream channel capacity to a fixed value, and (iii) setting an modulation error ratio (MER) target for plant maintenance. However, DOCSIS 3.1 enabled modems to be assigned to modulation profiles that are optimized for their channel conditions, and without a fixed value for channel capacity. In some instances, candidate profiles are tested by having a modem report back a number of Codewords received during testing, such as a Corrected Codeword Count (codewords that failed pre-decoding LDPC syndrome check and passed BCH decoding), an Uncorrectable Codeword Count (failed BCH decoding), and/or if the number of codeword failures was greater than a given threshold for the candidate profile.

Profile Creation

For further simplicity of explanation, the following description assumes that a user's demand for bandwidth is independent of the modulation profile to which the user (i.e., the modem device) is assigned. This assumption is reasonable for the purposes of this discussion, because the capability of a modem to use a particular profile is determined by the RF channel characteristics, which may be presumed to be independent of the user.

DOCSIS 3.1 includes the notion of a lowest-common-denominator profile, referred to as "Profile A" that can be utilized by all modems in the service group. In practice, it is mandatory that a Profile A be created (e.g., for broadcast data, at a minimum), to provide a useful metric J to assess the utility of a set of candidate profiles P, where $J_{P,A}$ is the ratio of the channel capacity $C_P$ using the set of candidate profiles P to the channel capacity CA only using profile A.

Profile-Based Codeword Re-Ordering of OFDM Symbols

Figure 1:
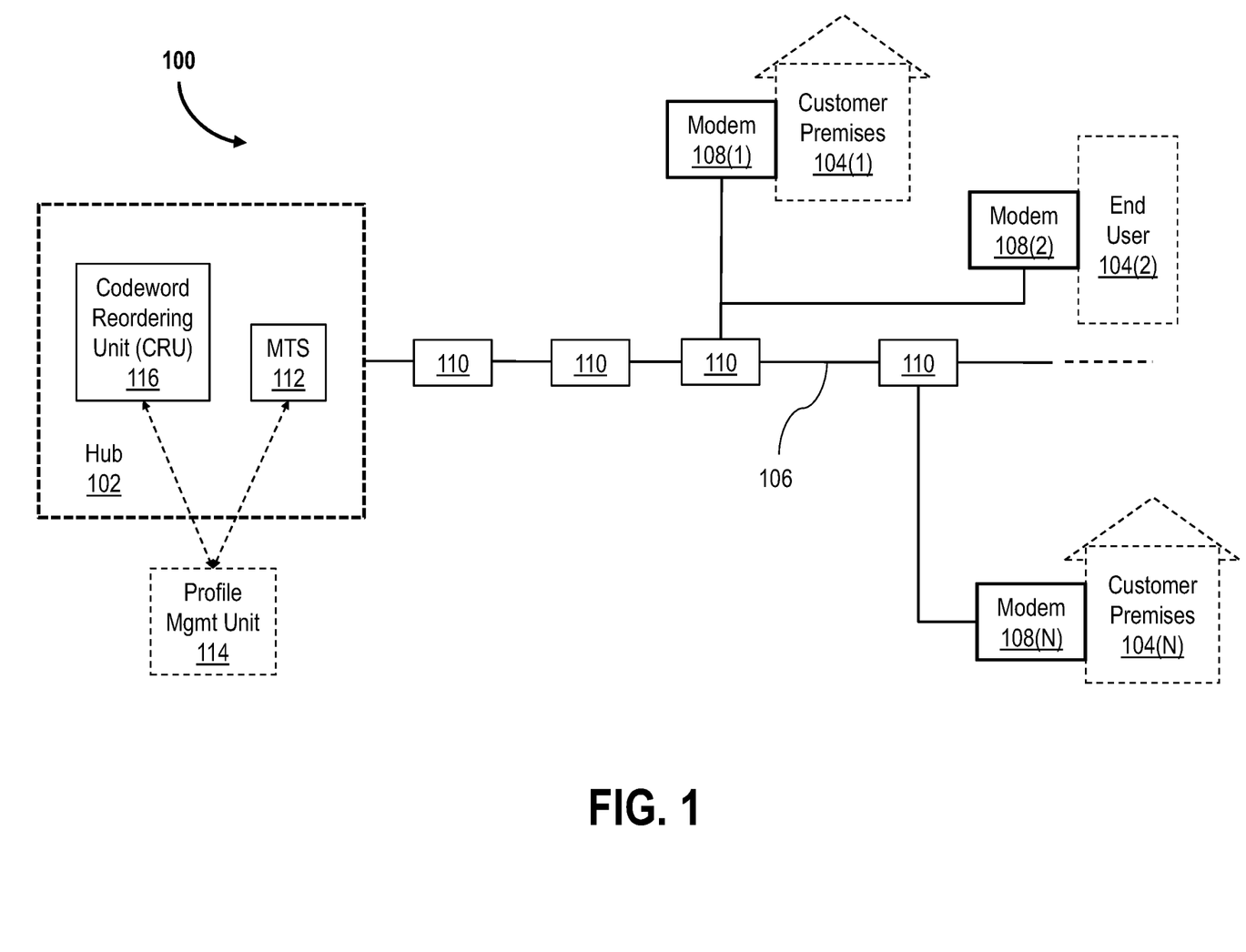
FIG. 1 is a schematic illustration depicting an exemplary communication network, in an embodiment.

FIG. 1 is a schematic illustration depicting an exemplary communication network 100. In the exemplary embodiment depicted in FIG. 1, network 100 includes a communications hub 102 configured to transmit and receive OFDM-configured digital information to one or more (i.e., 1-N) end users 104 over a communication medium 106. Communications hub 102 may include, for example, a central office, a headend, and/or an optical line terminal (OLT). Each end user 104 is a downstream termination unit, which may represent, for example, a customer device, customer premises (e.g., an apartment building or a home residence), a business user, and/or optical network unit (ONU).

In this example, each end user 104 includes a respective downstream receiving device 108, such as a modem (i.e., 1-N modems), which respectively connect to communications medium 106 through one or more of a plurality of respective taps 110 disposed along communications medium 106 (e.g., a cable plant, fiber optic line, etc.). Further to this example, hub 102 includes at least one modem termination system (MTS) 112 configured to transmit and receive digital information respectively to and from the plurality of modems 108. In at least one embodiment, modems 108 may include one or more cable modems (CMs), and MTS 112 may be a cable modem termination system (CMTS) or a virtualized CMTS (vCMTS).

In an optional embodiment, MTS 112 may further include a profile management unit 114 configured to manage and optimize DOCSIS profiles as described in U.S. Pat. No. 10,944,500. In this case, profile management unit 114 may be an integral portion of MTS 112, or may represent a separate, remote unit in operable communication with MTS 112. Different from conventional communication networks, hub 102 further includes a supplemental codeword reordering unit (CRU) 116 in communication with MTS 112, either directly, or indirectly through profile management unit 114, in the case where a profile management unit is employed. In one embodiment, CRU 116 may be integral to MTS 112 as either a distinct hardware unit, as a software module programmed to operate in coordination with a processor (not separately shown) of MTS 112, or a combination of hardware and software.

In the exemplary embodiment depicted in FIG. 1, communication network 100 is illustrated as a wired, DOCSIS-based system. The person of ordinary skill in the art though, will understand that this configuration is provided by way of example, and is not intended to be limiting. The innovative techniques provided by CRU 116 may be applied to other OFDM-based communication systems, including wireless systems utilizing wireless communication media. Operation of CRU 116 is described further below in greater detail with respect to FIGS. 2-4.

Figure 2A:
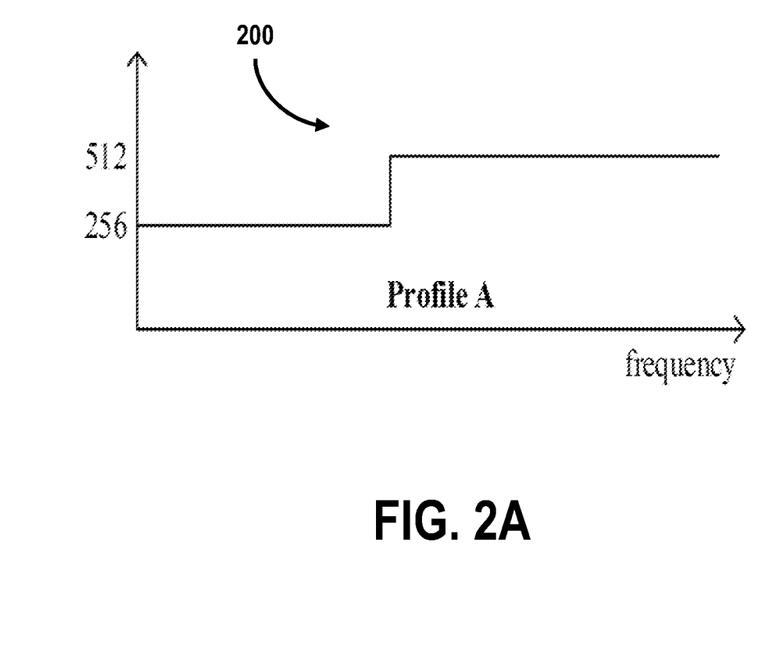
FIGS. 2A-B are graphical illustrations of respective profile plots for two different user profiles, according to an embodiment.
Figure 2B:
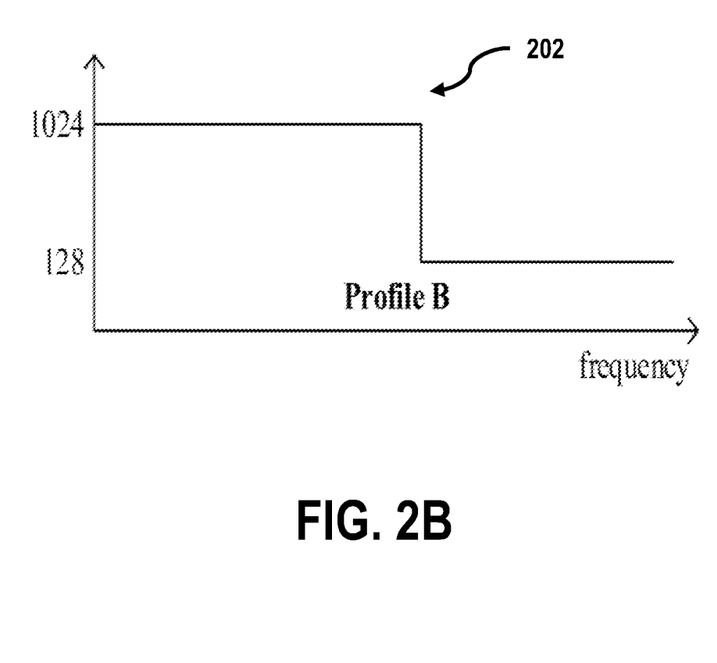

FIGS. 2A-B are graphical illustrations of respective profile plots 200, 202 for two different user profiles A and B, respectively. In the exemplary embodiment depicted in FIGS. 2A-B, only two OFDM user profiles of a single service group are illustrated for ease of explanation. As described above, a service group of user profiles may include many more than two user profiles. The principles described herein though, are equally applicable and advantageous in the case of three or more profiles and service group, or with respect to multiple service groups.

As illustrated in plots 200, 202, profiles A and B have different respective MER performances (i.e., modulations, or QAM orders and spectral efficiencies) at upper and lower frequency regions. In this example, profile A (i.e., plot 200) shows subcarriers at 256-QAM in its lower frequency region, and subcarriers at 512-QAM in its higher frequency region. Similarly, profile B (i.e., plot 202) has lower-frequency subcarriers at 1024-QAM and higher-frequency subcarriers at 128-QAM. In an exemplary embodiment, profiles A and B may be representative of profiles produced by MTS 112, FIG. 1, and optionally in cooperation with profile management unit 114.

Figure 3:
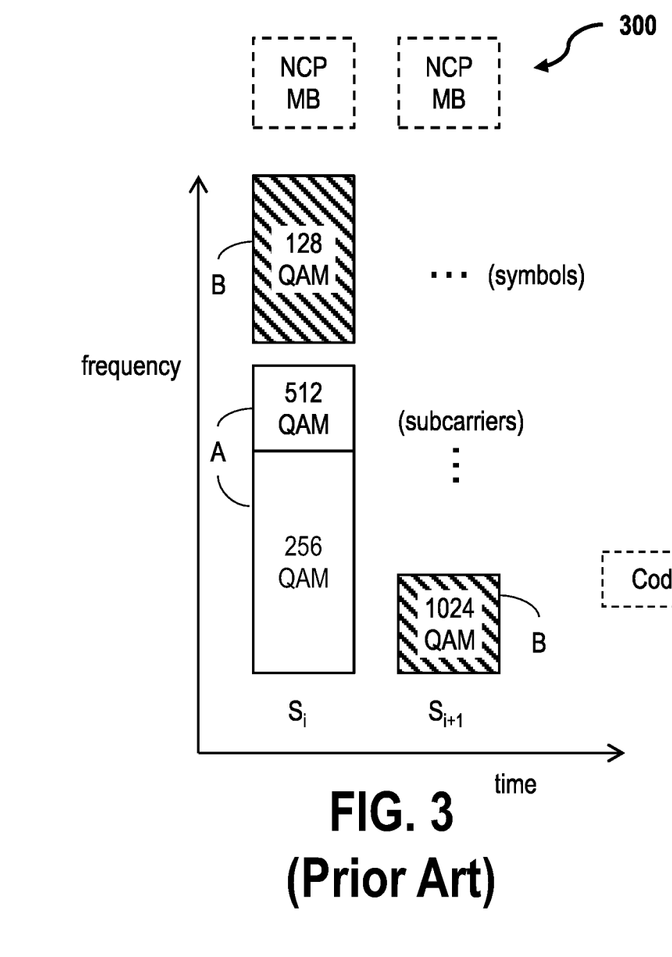
FIG. 3 is a graphical illustration depicting a conventional OFDM codeword mapping architecture for the user profiles depicted in FIG. 2.

FIG. 3 is a graphical illustration depicting a conventional OFDM codeword mapping architecture 300 for profiles A and B, FIG. 2 (plots 200, 202, respectively). More particularly, mapping architecture 300 represents a conventional codeword mapping scheme of profiles A and B onto OFDM subcarriers. That is, according to conventional techniques (e.g., DOCSIS protocols), codewords are generated which correspond to profiles A and B, and these generated codewords are then mapped onto OFDM subcarriers according to the profile order.

That is, according to the conventional scheme, the codeword associated with profile A is mapped onto the lower-frequency subcarriers of a first OFDM symbol $S_i$, while the codeword associated with profile B is mapped onto the remaining higher-frequency subcarriers of the same OFDM symbol $S_i$, as well as the lower-frequency subcarriers of the next OFDM symbol $S_{i+1}$. Thus, according to conventional techniques, the respective codewords are mapped to subcarriers without consideration of the actual spectral efficiency of each profile within the different respective (e.g., upper and lower) frequency regions of that profile.

In exemplary embodiment depicted in FIG. 3, profile A has a higher MER (i.e., higher QAM order and higher spectral efficiency) in the higher-frequency region, whereas the opposite is true for profile B, namely, higher MER in the lower-frequency region. Thus, as a result of this conventional mapping scheme, the two respective codewords for profiles A and B occupy a significant number of subcarriers within two OFDM symbols ($S_i$ and $S_{i+1}$, in this example). Additionally, as can be seen from mapping architecture 300, the majority of the subcarriers are mapped at the 128-QAM level (i.e., profile B) or the 256-QAM level (i.e., profile A), even though profiles A and B support up to 512-QAM and 1024-QAM, respectively.

Figure 4:
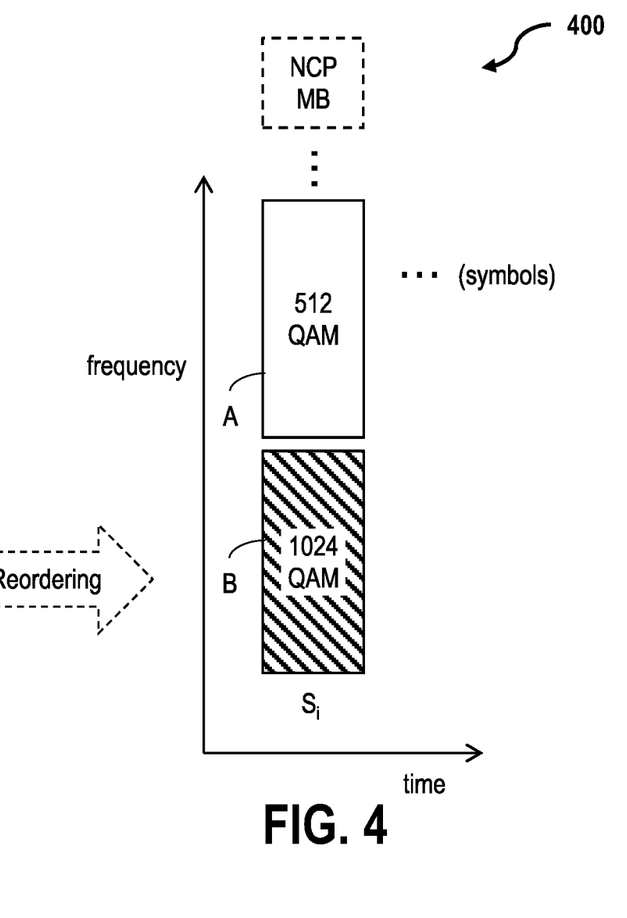
FIG. 4 is a graphical illustration depicting an exemplary OFDM codeword mapping architecture after codeword reordering of the conventional mapping architecture depicted in FIG. 3.

FIG. 4 is a graphical illustration depicting an exemplary OFDM mapping architecture 400 after codeword reordering of conventional mapping architecture 300, FIG. 3. More particularly, in an exemplary embodiment, mapping architecture 400 represents a re-mapping of conventional mapping architecture 300 after the operation of CRU 116, FIG. 1. In this new and additional operation, differing spectral efficiencies within a particular profile may be considered, and also with respect to the differing comparative spectral efficiencies of other profiles in the service group.

In an embodiment, at a high-level, CRU 116 may be programmed to obtain the profiles and/or mapping schemes generated according to the conventional technique, and then compute all possible mapping orders of the profiles in the service group to determine the most spectrally-efficient mapping order thereof (i.e., the exhaustive approach). In the case where only two profiles are considered (e.g., FIGS. 2-4), this computation is rather simple, as the number of possible mapping orders is relatively small. Therefore, as the number of profiles within a service group increases though, such computations become more complex and resource-intensive. Accordingly, the present systems and methods contemplate additional approaches to select more spectrally-efficient mapping orders than those generated by the conventional technique.

Once the most spectrally-efficient mapping order is determined, or at least a mapping order demonstrating greater spectral efficiency than the conventionally-generated mapping order (i.e., mapping architecture 300, FIG. 3), CRU 116 reorders the codewords of the profiles within the service group such that the respective codewords are mapped to OFDM subcarriers corresponding to the determined most (or greater) spectrally-efficient mapping order, as illustrated in the exemplary mapping architecture 400 depicted in FIG. 4.

In this simplified example of two profiles in the service group, the respective codewords of profiles A and B may be simply re-ordering from A-B to B-A, and thereby result in a significantly improvement to the overall spectral efficiency of the service group. In this example, a more spectrally efficient mapping order is determined such that the higher-order 512-QAM and 1024-QAM modulations are loaded onto a significantly smaller number of subcarriers within a single OFDM symbol $S_i$, but while still carrying the same amount of data as the conventional mapping architecture 300, FIG. 3. This additionally codeword reordering operation of the conventionally-mapped OFDM symbols thereby generates an improved, re-mapped architecture 400 that allocates profiles and codewords much more in consideration of the various spectral efficiencies within the particular profiles of a given service group.

In further exemplary operation of CRU 116, after re-ordering the profile codewords, the next codeword pointer (NCP) message block (MB), or NCP MB, carries corresponding mapping pointers. Although not shown in FIG. 4, additional conventional MTS processes, such as time interleaving for burst protection, as well as other succeeding processes, may nevertheless be executed in a complementary fashion with the techniques described herein, and according to the known, conventional techniques for these complementary, sometimes-optional, processes. Regardless, in the exemplary embodiment, implementation of processing from CRU 116 will occur on the generated signals sometime after conventional map ordering by MTS 112, but prior to transmission of the re-mapped OFDM symbols being transmitted onto communication medium 106, FIG. 1.

Figure 5:
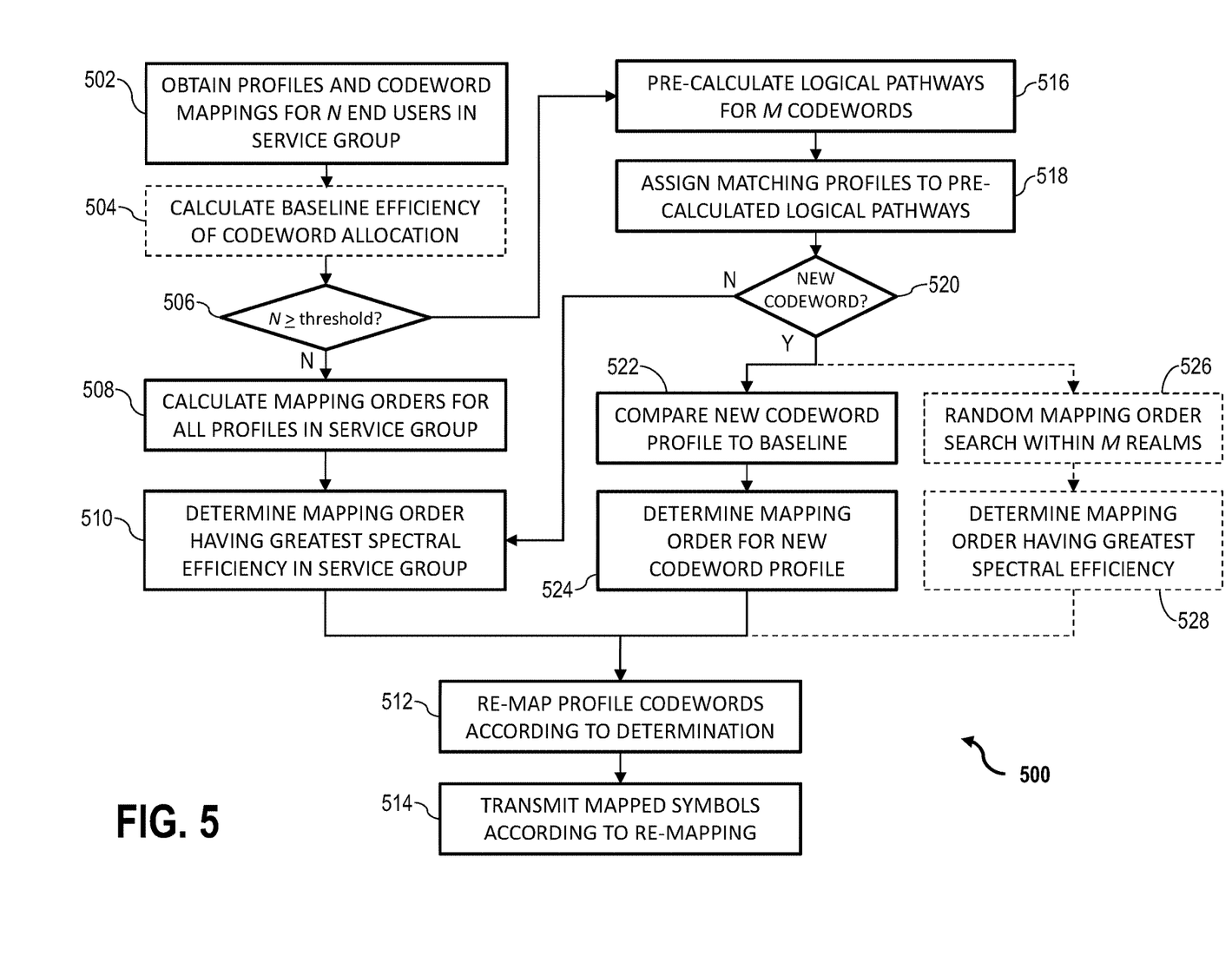
FIG. 5 is a flow diagram depicting an exemplary OFDM codeword reordering process, according to an embodiment.

FIG. 5 is a flow diagram depicting an exemplary OFDM codeword reordering process 500. In an exemplary embodiment, process 500 is implemented by CRU 116, FIG. 1, in cooperation with, or integrally within MTS 112. Unless described to the contrary, individual steps of process 500 may be performed in the order described, in a different order, or two or more of the several steps of process 500 may be performed simultaneously.

Process 500 begins at step 502, in which the MTS obtains profiles and codeword mappings for a downstream transmission over a channel to a population of N end user devices (e.g., modems 108, FIG. 1) within a given service group. In an exemplary embodiment, the downstream transmission includes a plurality of active subcarriers, and the profiles and codeword mappings may be obtained by the MTS through conventional techniques (e.g., conventional mapping architecture 300, FIG. 3). In optional step 504, the CRU calculates the spectral efficiency of codeword allocation according to the conventional mapping scheme, and sets this calculated value as a baseline value.

Step 506 is a decision step. In step 506, the CRU determines whether N is greater than or equal to a threshold value. In an embodiment of step 506, this threshold value is predetermined based on the computing resources of the MTS and/or network latency requirements. In an alternative embodiment of step 506, the threshold value is dynamically determined according to network conditions and/or the computational load on the processor of the MTS. If the number of end user devices in the service group is below the special value, process 500 proceeds to step 508.

In step 508, process 508 performs an exhaustive search, and calculates the mapping orders for all N profiles in the service group. In step 510, process 500 determines which mapping order, among all of the calculated mapping orders the exhaustive search, demonstrates the highest spectral efficiency and service group. In step 512, process 500 re-maps the profile codewords of the N profiles to OFDM symbols corresponding to the mapping order determined to have the highest spectral efficiency (e.g., reordered mapping architecture 400, FIG. 4). In step 514, the MTS transmits the reordered mapped symbols in the downstream network transmission of subcarriers (e.g., to end user devices 108 over communication medium 106, FIG. 1).

Referring back to decision step 506, because an exhaustive search will generally require N! times of mapping trials (i.e., N representing the number of codewords/profiles contained within one OFDM symbol on average). Nevertheless, as described above, for large values of N, alternative search techniques may be applied to the codewords/profiles obtained from the conventional mapping architecture, in order to reduce the computational requirements of the MTS processor. Several such alternative techniques are described further below with respect to steps 516-528. The person of ordinary skill in the art will understand that these additional steps are provided by way of example, and not in a limiting sense.

For example, if, in step 506, process 500 (e.g., CRU) determines that N is greater than or equal to the threshold value (i.e., the computational cost of an exhaustive search is prohibited), process 500 proceeds to step 516. In step 516, process 500 pre-calculates the logical pathways of potential mapping orders for M codewords, where M is less than N. In an exemplary embodiment of step 516, the CRU may consult a lookup table for commonly used or encountered codewords/profiles for the given network. In step 518, process 500 matches encountered codewords/profiles to the logical pathways pre-calculated in step 516.

Step 520 is a decision step. In step 520, process 500 determines whether an encountered codeword is new, that is, the encountered codeword does not match one of the M codewords utilized to pre-calculate the logical pathways in step 516. If, in step 520, process 500 determines that an encountered codeword is not new, process 500 returns to step 510, and determines a reordered mapping architecture (e.g., FIG. 4), having the highest spectral efficiency among the profiles and codewords assigned to the pre-calculated logical pathways. Process 500 then proceeds to steps 512 and 514.

If, however, in step 520, the new codeword does not match a pre-calculated logical pathway, process 500 may instead proceed to step 522. In step 522, process 500 compares the new codeword to the baseline efficiency calculated in step 504 (i.e., not an optional step in this embodiment). In step 524, process 500 determines, for the new codeword, a reordered mapping architecture having a higher spectral efficiency than the baseline value. Process 500 then proceeds to step 512, in which the M codewords according to the conventional mapping architecture (e.g., FIG. 3) are reordered and mapped to OFDM symbols corresponding to the reordered mapping architecture (e.g., FIG. 4) determined in step 524. Process then proceeds to step 514.

In an alternative embodiment, referring back to step 520, process 500 may proceed to step 526 instead of step 522. In step 526, process 500 performs a random search of potential mapping orders for the M realms of codewords pre-selected in step 516. In step 528, process 500 compares the mapping orders calculated according to the random search and new codeword, and selects the mapping order having the highest spectral efficiency within this restricted group of compared mapping orders. In this alternative embodiment, process 500 then proceeds to step 512, and then step 514.

The person of ordinary skill the art will understand that the pre-calculated template and random search techniques described above are provided by way of illustration, and are not intended to be limiting. When reading and comprehending the present specification and accompanying drawings, the person of ordinary skill in the art will further understand that other codeword reordering techniques may be employed without departing from the scope herein. For example, a service group of profiles may be further divided into profile subgroups, or individual profiles may be truncated. In all such exemplary embodiments, the conventional codeword symbol mapping architecture is reordered by an additional processing technique into a new mapping architecture having a greater spectral efficiency than what is realized according to the conventional mapping technique alone.

Proof of Concept

The systems and methods described above were tested in a simulation using real-world profile data. In this real-world test simulation, capacity for 2-5 profiles examined, and network performance results according to conventional subcarrier mapping techniques were compared against subcarrier mapping architectures according to the innovative codeword reordering techniques using an exhaustive search, as described above. The comparative results of this test simulation are shown below with respect to Table 2. As can be seen from Table 2, a significant capacity improvement is observed even in the case of only two profiles (i.e., 2.6%). Table 2 further demonstrates that the improvement increases with the number of profiles, observing up to a 10% capacity improvement for the five-profile scenario when compared to the conventional subcarrier mapping technique.

TABLE 2

Capacity (throughput) improvement vs. number of profiles.

| Profile number | Improvement % |
|---|---|
| 2 | 2.6 |
| 3 | 4.5 |
| 4 | 7 |
| 5 | 10 |

Thus, although an increase in the number of profiles will increase the computational load to implement the present systems and methods, the test results shown in Table 2 demonstrates that the corresponding increase in capacity improvement may significantly outweigh this additional computational cost (i.e., in the case where the MTS or network is capable of absorbing this cost).

Additionally, the above embodiments are described above with respect to the downlink/downstream transmission for ease of explanation, and not in a limiting sense. The person of ordinary skill the art will understand that the systems and methods herein are also applicable to the uplink/upstream transmission paradigm, and particularly for uplink transmissions utilizing subcarriers of a specific type (e.g., data subcarriers, pilots, complementary pilots, etc.) within a minislot having the same modulation order. In this uplink scenario, the modulation order may be determined by the profile associated with the minislot. By re-ordering different minislots over the frequency axis based on these profiles, the average modulation order, and consequently the overall spectral efficiency, may be further improved according to the techniques described herein. That is, in such cases, the conventional mapping and interleaving in the uplink will be further processed to reorder the corresponding profiles and codewords, as described above, and the respective uplink symbols may alternatively be mapped to orthogonal frequency division multiple access (OFDMA) symbols.

According to the present embodiments, a significant capacity improvement is realized through the implementation of an additional codeword reordering technique for transmitted OFDM (or OFDMA) symbols, prior to transmission. These improvements may be achieved through the addition of a dedicated hardware unit (e.g., a CRU), or through relatively straightforward software programming in the MTS. As demonstrated above, the present systems and methods are capable of realizing a 10% capacity improvement to the downlink through only minor algorithm optimization (i.e., a minor firmware adjustment to the MTS), due to the low computational complexity required for a profile service group of only 5 user profiles.

The innovative techniques described herein may be further advantageously implemented with respect to the uplink as well without requiring additional hardware or architectural upgrades. The uplink improvements may also be realized with relatively straightforward firmware changes to the MTS. Additionally, the improvements realized according to the present embodiments may be achieved in both the downlink and the uplink without requiring any modification or upgrade to the respective downstream end user devices (e.g., modems, CMs, etc.). The present inventors further contemplate that the improvements realized herein continue to increase with a corresponding increase in the number of profiles reordered, and also with respect to profiles having a larger MER variation over their frequency spectrum (i.e., more than two modulation levels within a single profile).

Exemplary embodiments of systems and methods for profile codeword reordering are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, such is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of optimizing a set of profiles in a transmission to a population of user devices over a channel, the transmission including a plurality of active subcarriers, comprising the steps of:
    obtaining a symbol mapping architecture for the set of profiles, the symbol mapping architecture (i) including a respective codeword for each profile of the set of profiles, and (ii) mapping the respective codewords to a first number of symbols according to a logical order of each profile in the set of profiles;
    calculating, from the symbol mapping architecture, a plurality of mapping orders for the set of profiles different from the logical order;
    determining, from the calculated plurality of mapping orders, a particular mapping order having a higher spectral efficiency than the logical order;
    reordering the respective codewords of the set of profiles to correspond to the particular mapping order;
    re-mapping the symbol mapping architecture to a second number of symbols corresponding to the reordered codewords; and
    transmitting the second number of symbols to the population of user devices.

2. The method of claim 1, wherein the first and second numbers of symbols include orthogonal frequency division multiplexing (OFDM) symbols.

3. The method of claim 2, wherein the OFDM symbols a data over cable system interface specification (DOCSIS) format.

4. The method of claim 2, wherein the transmission is a downlink transmission.

5. The method of claim 4, wherein the method is performed by modem termination system (MTS).

6. The method of claim 5, wherein the MTS includes one or more of a cable MTS (CMTS), a virtualized CMTS (vCMTS), an optical network terminal (ONT), an optical line terminal (OLT), a network termination unit, and a satellite termination unit.

7. The method of claim 5, wherein the population of user devices include a plurality of modems.

8. The method of claim 7, wherein each modem of the plurality of modems includes one or more of a cable modem (CM), an optical network unit (ONU), a digital subscriber line (DSL) unit/modem, and a satellite modem.

9. The method of claim 5, wherein the MTS includes a codeword reordering unit (CRU).

10. The method of claim 9, wherein the CRU is integral to the MTS.

11. The method of claim 9, wherein the CRU is one of a dedicated hardware unit, a software module, a firmware modification, and a hybrid software/hardware combination.

12. The method of claim 9, wherein at least one of the CRU and the MTS is in operable communication with a profile management unit.

13. The method of claim 1, wherein the first number of symbols is greater than the second number of symbols.

14. The method of claim 1, wherein the particular mapping order is further determined to have the highest spectral efficiency from among the calculated plurality of mapping orders.

15. The method of claim 14, wherein the plurality of mapping orders is calculated according to an exhaustive search.

16. The method of claim 1, wherein the plurality of mapping orders is calculated from a random search of a subset of the set of profiles smaller than the set of profiles.

17. The method of claim 1, wherein the plurality of mapping orders is pre-calculated, and wherein at least one of the respective codewords is matched to a pre-calculated mapping order.

18. The method of claim 1, wherein the transmission is an uplink transmission.

19. The method of claim 18, wherein the first and second numbers of symbols include orthogonal frequency division multiple access (OFDMA) symbols.

20. A transmitter for a communication network, comprising:
a modem termination system (MTS) in operable communication with a communication medium, the MTS configured to (i) obtain a plurality of downstream profiles for a respective plurality of downstream user devices connected to the communication medium, (ii) map codewords respectively associated with the plurality of downstream profiles to subcarriers within a first number of symbols according to a logical order of the downstream profiles, and (iii) transmit a second number of symbols to the plurality of downstream user devices in a downstream transmission; and
a codeword reordering unit (CRU) configured to (i) calculate a plurality of mapping orders for the plurality of downstream profiles different from the logical order, (ii) determine, from the calculated plurality of mapping orders, a particular mapping order having a higher spectral efficiency than the logical order, (iii) reorder the codewords to correspond to the particular mapping order, and (iv) re-map the first number of symbols to the second number of symbols corresponding to the reordered codewords.

* * * * *